United States Patent
St. Louis

(10) Patent No.: US 10,179,660 B2
(45) Date of Patent: Jan. 15, 2019

(54) HELICOPTER DOCKING/TRANSPORT SYSTEM

(71) Applicant: St. Louis Designs, Inc., Austin, TX (US)

(72) Inventor: Matthew St. Louis, Austin, TX (US)

(73) Assignee: St. Louis Designs, Inc., Austin, TX (US)

( * ) Notice: Subject to any disclaimer, the term of this patent is extended or adjusted under 35 U.S.C. 154(b) by 0 days.

(21) Appl. No.: 15/496,598

(22) Filed: Apr. 25, 2017

(65) Prior Publication Data

US 2017/0334580 A1  Nov. 23, 2017

Related U.S. Application Data

(60) Provisional application No. 62/329,512, filed on Apr. 29, 2016.

(51) Int. Cl.
| | |
|---|---|
| *B64F 1/22* | (2006.01) |
| *B60P 3/11* | (2006.01) |
| *B66F 7/06* | (2006.01) |
| *B66F 7/28* | (2006.01) |

(52) U.S. Cl.
CPC ............... *B64F 1/227* (2013.01); *B60P 3/11* (2013.01); *B66F 7/065* (2013.01); *B66F 7/28* (2013.01)

(58) Field of Classification Search
CPC .. B64F 1/22; B64F 1/227; B64F 1/228; Y10S 180/904; B60P 3/11
See application file for complete search history.

(56) References Cited

U.S. PATENT DOCUMENTS

| | | | | |
|---|---|---|---|---|
| 3,009,711 A | * | 11/1961 | White | B64F 1/22 280/43.23 |
| 3,761,040 A | | 9/1973 | Cummins | |
| 4,033,422 A | * | 7/1977 | Benning | B60P 3/11 180/14.1 |
| 4,223,856 A | * | 9/1980 | DiVincenzo | B64F 1/22 180/904 |
| 4,488,612 A | * | 12/1984 | Patterson | B64F 1/22 180/14.1 |
| 4,516,744 A | | 5/1985 | Burnside | |
| 4,580,764 A | * | 4/1986 | Oldani | B64F 1/22 254/9 C |

(Continued)

*Primary Examiner* — Mark C Hageman
(74) *Attorney, Agent, or Firm* — Meyertons, Hood, Kivlin, Kowert & Goetzel, P.C.

(57) ABSTRACT

In some embodiments, a system and/or method a may include a helicopter transport system. The helicopter transport system may include a support frame. The support frame may be substantially rectangular. The helicopter transport system may include a first pair of wheels. In some embodiments, the first pair of wheels may be positioned on opposing sides of the outer perimeter of the support frame towards a first end of the support frame. The helicopter transport system may include a second pair of wheels. The second pair of wheels may be positioned adjacent one another within the perimeter of the support frame towards a second end of the support frame. The first end of the support frame may be positioned opposite the second end of the support frame. The helicopter transport system may include a lift mechanism coupled to the support frame. The lift mechanism may elevate, during use, a helicopter above the support frame.

20 Claims, 6 Drawing Sheets

(56) References Cited

U.S. PATENT DOCUMENTS

| | | | | |
|---|---|---|---|---|
| 5,056,981 A | * | 10/1991 | Knowles | B64F 1/22 180/19.1 |
| 5,135,346 A | | 8/1992 | Roach | |
| 5,701,966 A | * | 12/1997 | Amico | B62D 57/00 180/19.1 |
| 6,203,263 B1 | | 3/2001 | Hancock | |
| 6,669,250 B1 | | 12/2003 | St. Louis | |
| 8,205,562 B2 | | 6/2012 | St. Louis | |
| 8,205,563 B2 | | 6/2012 | St. Louis | |
| 8,205,564 B2 | | 6/2012 | St. Louis | |
| 8,573,916 B2 | * | 11/2013 | Hwu | B64F 1/22 244/17.17 |
| 8,915,196 B2 | | 12/2014 | St. Louis | |
| 2012/0255802 A1 | | 10/2012 | Hancock | |
| 2015/0053833 A1 | | 2/2015 | St. Louis | |

\* cited by examiner

HELICOPTER DOCKING/TRANSPORT SYSTEM

PRIORITY CLAIM

This application claims priority to U.S. Provisional Application Ser. No. 62/329,512 entitled "HELICOPTER DOCKING/TRANSPORT SYSTEM" filed Apr. 29, 2016, which is incorporated herein by reference in its entirety.

BACKGROUND

Technical Field

Embodiments described herein relate to transportation systems. More particularly, some embodiments disclosed herein relate to systems for facilitating ground transportation for aerial vehicles including, but not limited to, helicopters.

Description of the Related Art

The present disclosure relates to helicopter transport vehicles. Many helicopters make use of skids for support and stability when positioned on the ground, mainly to reduce the weight of the vehicle during flight. While a helicopter is highly maneuverable in the air, it is not easily maneuvered on the ground when it is supported by simple skids. In the past some small helicopters have been transported on the ground using simple manpower. More recently dollies have been used to transport helicopters on the ground; however current systems leave much to be desired. Specifically current designs do not allow for maneuvering in confined quarters and/or around sharp turns.

Therefore, a system and/or method which better facilitates maneuvering a helicopter on the ground more efficiently would be beneficial.

SUMMARY

In some embodiments, a system may include a helicopter transport system. The helicopter transport system may include a support frame. The support frame may be substantially rectangular. The helicopter transport system may include a first pair of wheels. In some embodiments, the first pair of wheels may be positioned on opposing sides of the outer perimeter of the support frame towards a first end of the support frame. The helicopter transport system may include a second pair of wheels. The second pair of wheels may be positioned adjacent one another within the perimeter of the support frame towards a second end of the support frame. The first end of the support frame may be positioned opposite the second end of the support frame. The helicopter transport system may include a lift mechanism coupled to the support frame. The lift mechanism may elevate, during use, a helicopter above the support frame.

In some embodiments, the lift mechanism may be positioned between the first and second pair of wheels. In some embodiments, the lift mechanism may include a coupling mechanism which couples, during use, the lift mechanism to a portion of a helicopter. The coupling mechanism may include a saddle including a substantially non marring surface. In some embodiments, the lift mechanism may include a scissor lift In some embodiments, a theoretical outline formed by the second pair of wheels and the first pair of wheels form a triangle. At least the first pair of wheels turn such that the transport may turn.

In some embodiments, a helicopter transport system may include an engine which functions to provide power to the system for movement of the system and/or powering the lift mechanism. The engine may include an electric engine and a battery powering the electric engine.

In some embodiments, a helicopter transport system may include a control system. The control system may be coupled to the frame. The control system may control an operation of the helicopter transport system.

In some embodiments, a method may include transporting a helicopter using a helicopter transport system as described herein. The method may include positioning a helicopter transport system substantially beneath a helicopter positioned on a surface. The method may include activating the lift mechanism such that a portion of the lift mechanism engages a portion of the helicopter elevating the helicopter above the surface. The method may include transporting the helicopter from a first position to a second position.

BRIEF DESCRIPTION OF THE DRAWINGS

The following detailed description makes reference to the accompanying drawings, which are now briefly described.

Figure 1:
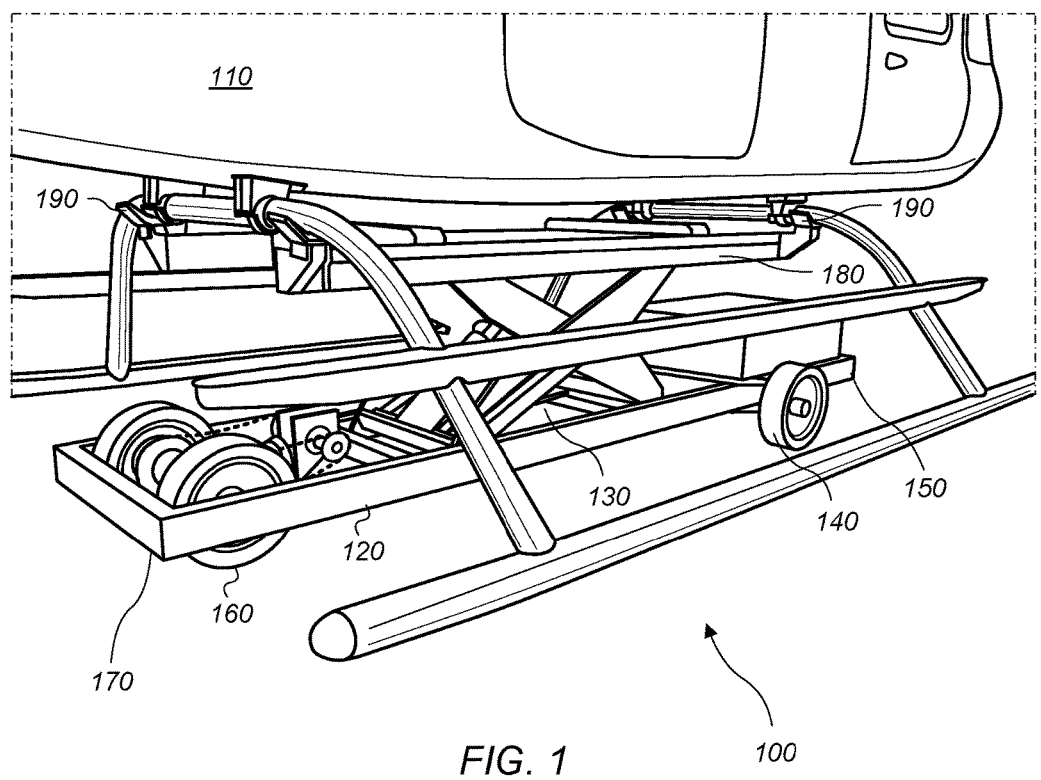
FIG. 1 depicts a perspective view of an embodiment of a helicopter transport system including a helicopter elevated for transport.

Specific embodiments are shown by way of example in the drawings and will be described herein in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task. In some contexts, "configured to" may be a broad recitation of structure generally meaning performs the task or tasks during operation. As such, the component can be configured to perform the task even when the component is not currently on.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 paragraph (f), interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Definitions

Unless defined otherwise, all technical and scientific terms used herein have the same meaning as commonly understood by one of ordinary skill in the art.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process effects another process or structure without the involvement of an intermediate step or component.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Figure 2:
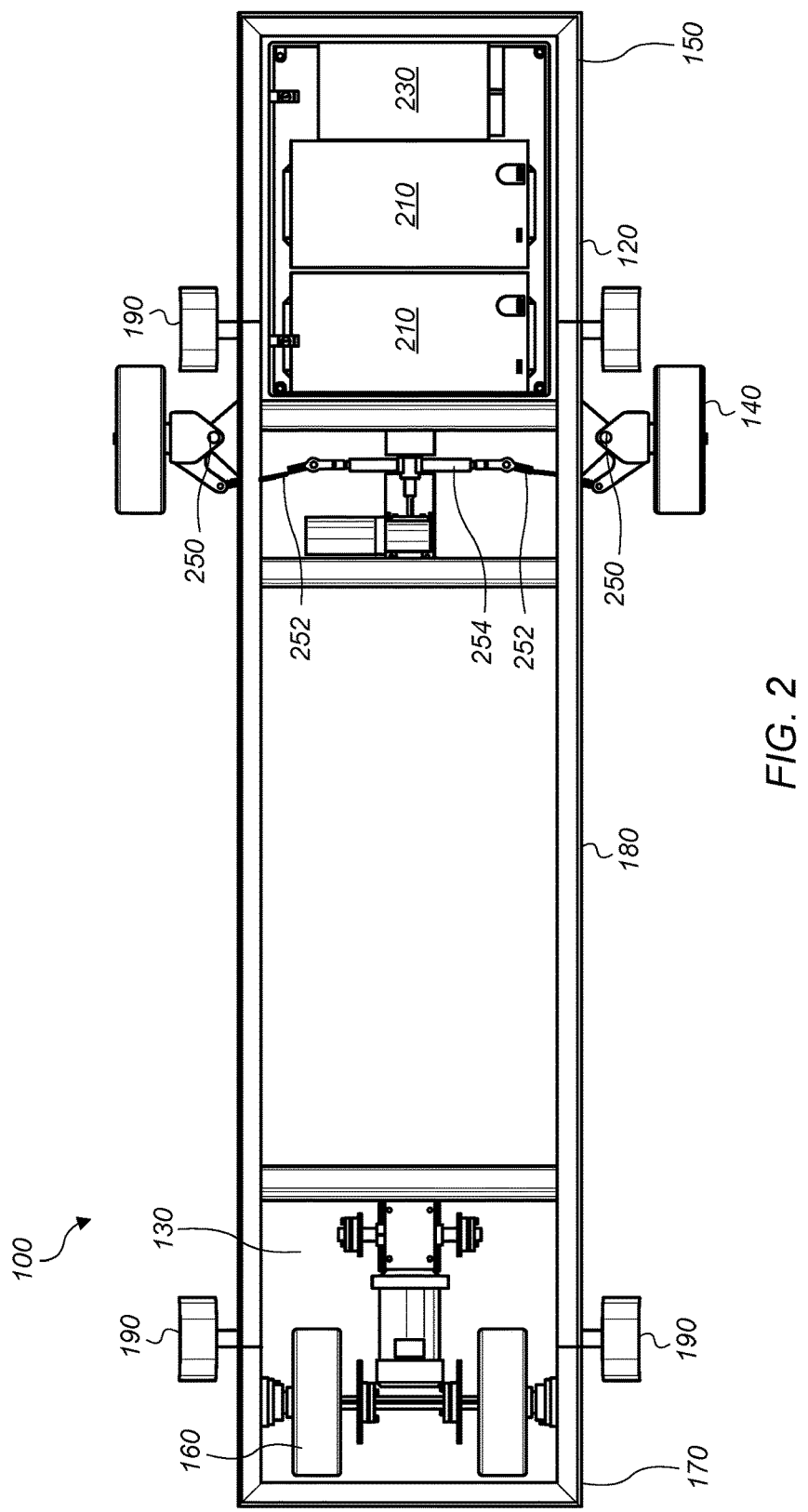
FIG. 2 depicts a top view of an embodiment of a helicopter transport system.
Figure 3:
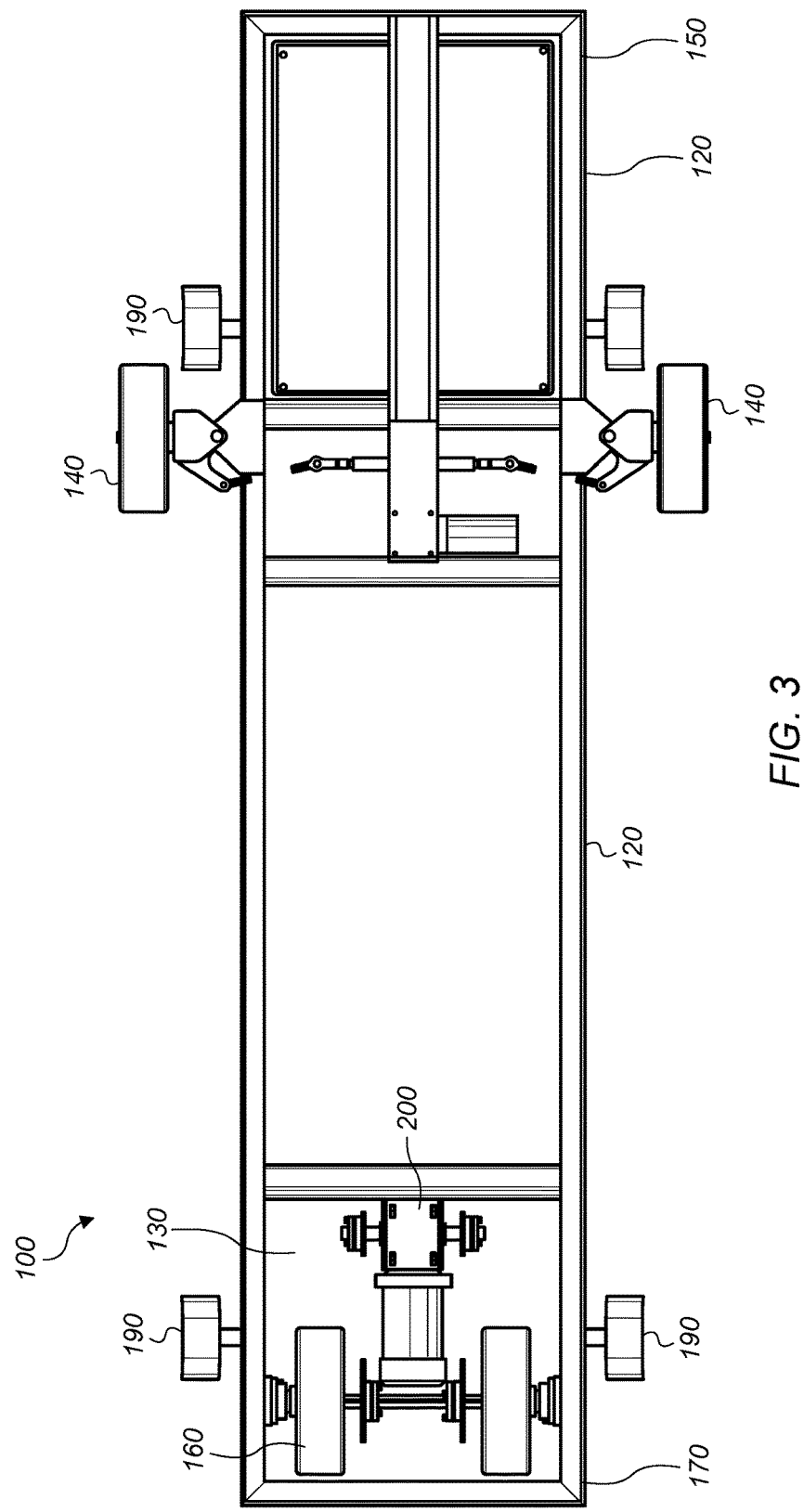
FIG. 3 depicts a bottom view of an embodiment of a helicopter transport system.

In some embodiments, a system and/or method may include a helicopter transport system. FIG. 1 depicts a perspective view of an embodiment of a helicopter transport system 100 including a helicopter 110 elevated for transport along a surface. FIGS. 2-3 depict a top and a bottom view respectively of an embodiment of a helicopter transport system 100. The helicopter transport system 100 may include a support frame 120. The support frame may be substantially rectangular. In some embodiments, the support frame may in fact be substantially trapezoidal or at least slightly trapezoidal when referring to a substantially rectangular shape.

The support frame may be formed from a material capable of supporting the weight of most known helicopters. Helicopters may weigh, for example, anywhere from about one half ton to about five tons depending on size and use of the helicopter. For example, the support frame may be formed from square tube steel.

In some embodiments, the support frame may include an opening 130 running through the frame (e.g., as depicted in FIGS. 1-3). Different components of the helicopter transport system (e.g., batteries, motors, etc.) may be positioned in the opening. In some embodiments, a platform or support may be coupled to an underside of support frame in order to support components of the system positioned in the opening. The platform may or may not run the length of the support frame. The platform may or may not extend beyond the frame in order to support additional components of the system and/or additional related components (e.g., tools etc.).

In some embodiments, the helicopter transport system may include a first pair of wheels 140 (e.g., as depicted in FIGS. 1-3 and 4). In some embodiments, the first pair of wheels may be positioned on opposing sides of the outer perimeter of the support frame 120 towards a first end 150 of the support frame.

In some embodiments, the helicopter transport system 100 may include a second pair of wheels 160 (e.g., as depicted in FIGS. 1-3 and 5). The second pair of wheels 160 may be positioned adjacent one another within the perimeter of the support frame 120 towards a second end 170 of the support frame. In some embodiments the second pair of wheels may be positioned substantially adjacent each other. In some embodiments, the second pair of wheels may include a single wheel (the single wheel may be substantially wider than either of the first pair of wheels in order to provide greater stability). The first end of the support frame may be positioned opposite the second end of the support frame.

Positioning the wheels as discussed above may result in the wheels being in a substantially trapezoidal (e.g., an isosceles trapezoid) or a substantially triangular relationship. In some embodiments, a theoretical outline formed by the second pair of wheels and the first pair of wheels form a triangle. At least the first pair of wheels turn such that the transport may turn. In some embodiments, positioning the wheels in such a relationship may allow for a much tighter turning radius especially relative to current systems in which wheels are positioned in a square or rectangular relationship relative to each other. The importance of a tight turning radius cannot be stressed enough as it allows helicopters to be transported along tight, for example, private driveways and in and out of storage.

In some embodiments, the helicopter transport system 100 may include a lift mechanism 180 coupled to the support frame 120. The lift mechanism may elevate, during use, a helicopter above the support frame or at least above a surface the helicopter is resting on such that the helicopter may be conveyed from a first location to a second location.

In some embodiments, the lift mechanism may be positioned substantially between the first and second pair of wheels. In some embodiments, the lift mechanism may include a coupling mechanism 190 which couples, during use, the lift mechanism to a portion of a helicopter. The coupling mechanism may include a saddle (e.g., as depicted in FIGS. 1-5). The coupling mechanism may include a substantially non marring surface. In some embodiments, the coupling mechanism may include something that locks around or onto a portion of the helicopter (e.g., the landing gear including for example landing struts and/or landing skids) such that the coupling mechanism is inhibited from decoupling from the helicopter without unengaging the coupling mechanism.

In some embodiments, the lift mechanism may include any type actuation device capable of safely elevating a helicopter. In some embodiments, the lift mechanism may include a lift based upon hydraulic actuation, mechanical actuation, or pneumatic actuation. Hydraulic actuation works by creating pressurized hydraulic oil in the cylinders that work to raise and lower the lift. Mechanical actuation may include a scissor lift or a ball screw actuator. Pneumatic actuation based on compressed air to operate the lift. In some embodiments, the lift mechanism may include a scissor lift (e.g., 180 as depicted in FIGS. 1-2 and 4-5).

Figure 6:
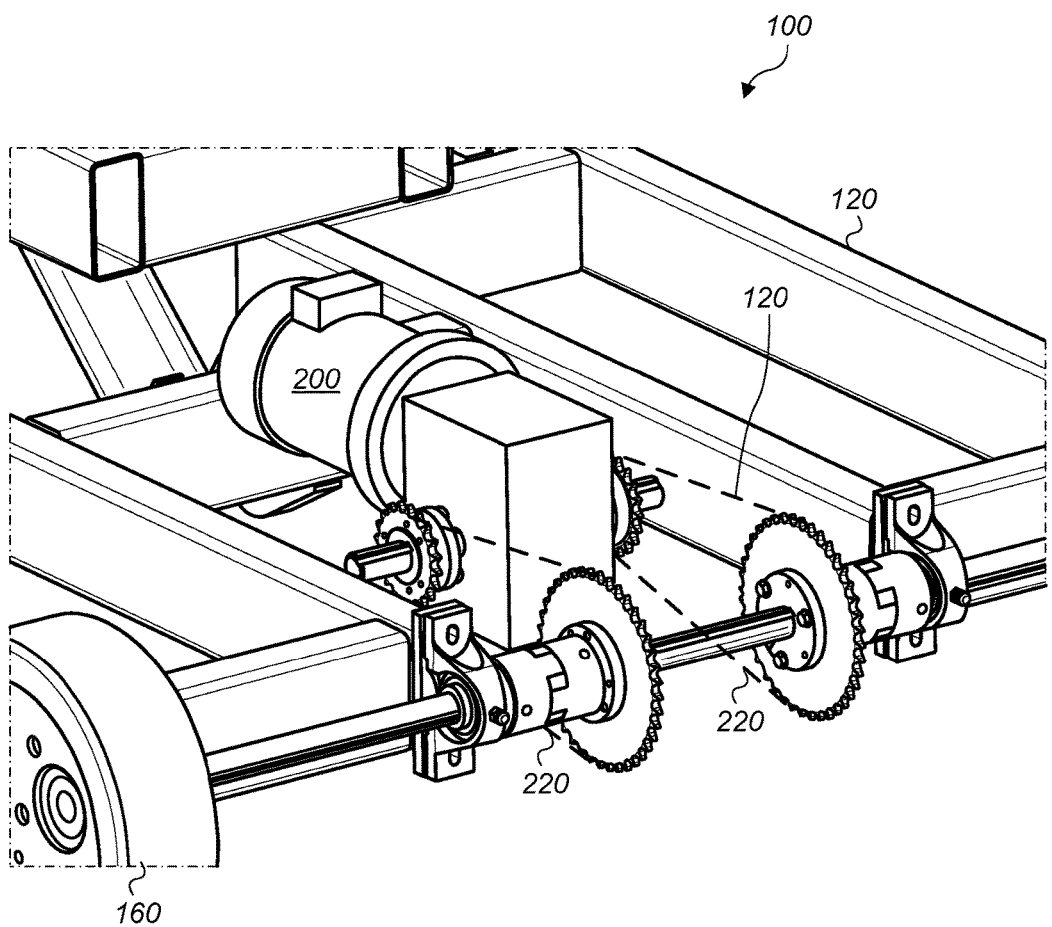
FIG. 6 depicts a perspective view of a second end of an embodiment of a drive system for a helicopter transport system.

In some embodiments, a helicopter transport system may include a drive mechanism or an engine 200 (e.g., depicted in FIGS. 3 and 5-6) which functions to provide power to the system for movement of the system and/or powering the lift mechanism. In some embodiments, the engine may include an electric engine or an internal combustion engine. An electric engine may include a rechargeable battery 210 (e.g., depicted in FIGS. 2 and 4) or a group of batteries powering the electric engine.

In some embodiments, the drive mechanism may include two or more drive chains 220 (e.g., depicted in FIGS. 5-6) coupled to the engine 200. If the drive chain on a motorcycle breaks from fatigue, the motorcycle is rendered inoperable. To avoid this potential scenario with a helicopter transporter, a dual drive system may be implemented to share the load and eliminate the potential for the transporter becoming inoperable if a chain happens to break. The remaining chain will continue to perform allowing time to schedule a repair.

Figure 4:
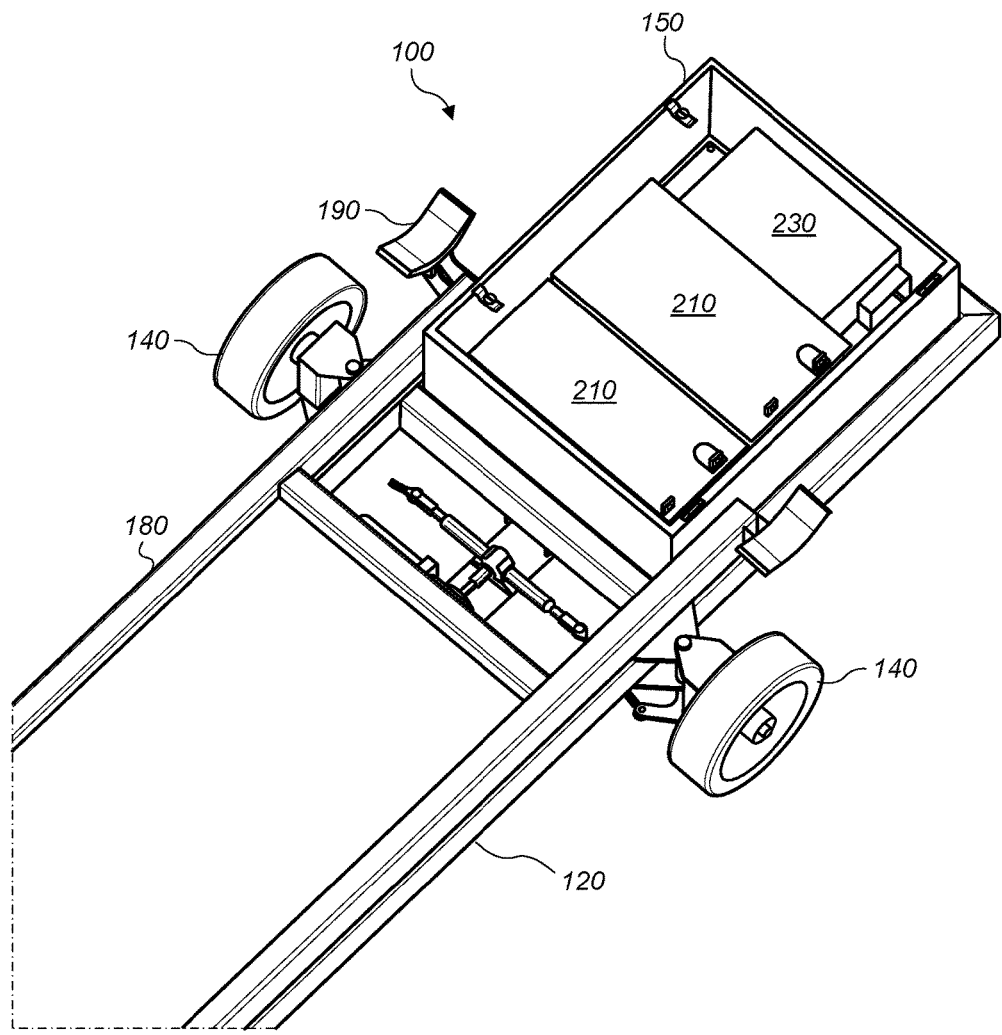
FIG. 4 depicts a top perspective view of a first end of an embodiment of a helicopter transport system.
Figure 5:
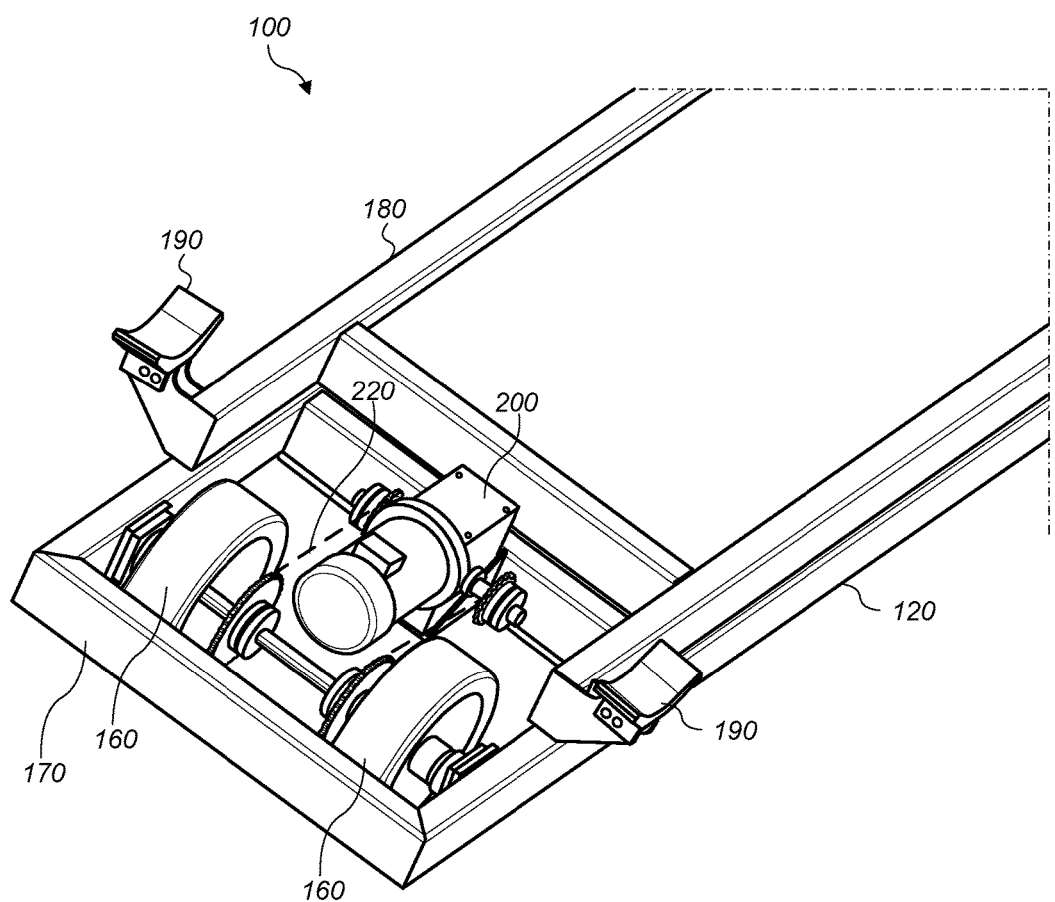
FIG. 5 depicts a top perspective view of a second end of an embodiment of a helicopter transport system.

In some embodiments, a helicopter transport system may include a control system 230 (e.g., depicted in FIGS. 2 and 4). The control system 230 may be coupled to the frame. The control system may control an operation of the helicopter transport system. In some embodiments the control system may include a hand held control system. The control system may be coupled to the helicopter transport system electrically via a wired and/or a wireless connection. In some embodiments, the helicopter transport system may be controlled wirelessly using a software application which may be downloaded to a computer (e.g., a cellular phone, a laptop computer, etc.).

To provide better maneuverability it is important for a helicopter transport system described herein to include an efficient steering mechanism. Typically a helicopter transport system as described herein will be moving at relatively slow speeds and therefore it is advantageous to employ a steering mechanism which works efficiently at slow speeds to provide good maneuverability.

When a vehicle is moving very slowly, there is a kinematic condition between the inner and outer wheels that allows them to turn slip-free otherwise known as the Ackerman condition. The Ackerman condition requires the normal line to the center of each tire-plane must intersect at a common point to have all wheels turning freely on a curved road. The Ackerman condition applies most strongly when the vehicle is moving at low speeds and slip angles are substantially zero (i.e., no lateral force and no centrifugal force to balance each other). The Ackerman condition is sometimes referred to as the kinematic steering condition, due to the condition is a static condition at zero velocity. A steering mechanism that provides steering according to the Ackerman condition is sometimes called Ackerman steering or Ackerman mechanism. There is no four-bar linkage steering mechanism that can provide the Ackerman condition perfectly. However, it is possible to employ multi-bar linkages which provide results very close to the theoretical Ackerman mechanism.

In some embodiments, the Ackerman mechanism is a geometric arrangement of linkages in the steering of a car or other vehicle designed to solve the problem of wheels on the inside and outside of a turn needing to trace out circles of different radii. The intention of Ackermann geometry is to avoid the need for tires to slip sideways when following the path around a curve. In some embodiments, all of vehicles wheels may have their axles arranged as radii of circles with a common center point. If one pair of wheels are fixed (e.g., the rear wheels), this center point must be on a line extended from the rear axle. Intersecting the axes of the turning wheels (e.g., the front wheels) on this line as well requires that the inside turning wheel is turned, when steering, through a greater angle than the outside wheel.

As opposed to "turntable" steering, where both front wheels turned around a common pivot, with an Ackerman mechanism each wheel gains its own pivot, close to its own hub. Such an arrangement enhances controllability by avoiding large inputs from road surface variations being applied to the end of a long lever arm, as well as greatly reducing the fore-and-aft travel of the steered wheels. A linkage between these hubs pivots the two wheels together, and by arrangement of the linkage dimensions the Ackermann geometry can be approximated. In some embodiments, the Ackermann geometry may be achieved by making the linkage shorter than that of the axle, so that the steering arms of the hubs appeared to splay out. As the steering moved, the wheels turned such that the inner wheel turning further than the outer wheel. In some embodiments, if the track rod is placed ahead of the axle, it should instead be longer in comparison, thus preserving this same splay out movement of the wheels.

In some embodiments, Ackermann steering geometry may be approximated by moving the steering pivot points inward so as to lie on a line drawn between the steering kingpins and the center of the rear axle. The steering pivot points may be joined by a rigid bars called tie rods coupled by a center linkage which can also be part of the steering mechanism. With perfect Ackermann steering, at any angle of steering, the center point of all of the circles traced by all wheels will lie at a common point. Modern cars do not use pure Ackermann steering, partly because it ignores important dynamic and compliant effects, but the principle is sound for low-speed maneuvers as systems described herein typically will employ.

In some embodiments, Ackerman steering geometry may be employed by a helicopter transport system as described herein. In some embodiments, a helicopter transport system may include at least one pair of wheels employing Ackerman steering geometry. In some embodiments, a front pair of wheels (e.g., wheels positioned on an exterior of the frame) may include an Ackerman style linkage mechanism for steering. In some embodiments, a helicopter transport system may include a steering linkage for at least one pair of wheels and at least one pair of wheel(s) which do not pivot. The turning wheels may each include a pivoting coupling mechanism 250 which couples (e.g., directly attaches) the wheels to the frame of the helicopter transport system. The steering linkage may include an elongated member 254. The elongated member may be shorter than an actual or theoretical axle connecting the wheels. The elongated member may be offset from a theoretical line connecting the two wheels. Each wheel may be coupled to the nearest opposing end of the elongated member with a coupling member 252 (e.g., depicted in FIG. 2). The coupling member may be pivotally coupled to the elongated member and a wheel such that when activated the wheels turn such that the inner wheel turns further than the outer wheel In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A helicopter transport system, comprising:
a support frame, wherein the support frame is substantially rectangular;
a first pair of wheels positioned on opposing sides of the outer perimeter of the support frame towards a first end of the support frame;
a second pair of wheels positioned adjacent one another within the perimeter of the support frame towards a second end of the support frame such that a first distance between outer sides of the second pair of wheels, and all wheels positioned towards the second end of the support frame, is less than a second distance between inner sides of the first pair of wheels and all wheels positioned towards the first end of the support frame, such that the wheels are in a isosceles trapezoidal relationship, wherein the first end of the support frame is positioned opposite the second end of the support frame;
a lift mechanism coupled to the support frame, wherein the lift mechanism elevates, during use, a helicopter above the support frame.

2. The system of claim 1, wherein the lift mechanism is positioned between the first and second pair of wheels.

3. The system of claim 1, wherein the lift mechanism comprises a coupling mechanism which couples, during use, the lift mechanism to a portion of a helicopter.

4. The system of claim 1, wherein the lift mechanism comprises a coupling mechanism which couples, during use, the lift mechanism to a portion of a helicopter, wherein the coupling mechanism comprises a saddle comprising a substantially non marring surface.

5. The system of claim 1, wherein at least the first pair of wheels turn such that the transport may turn.

6. The system of claim 1, further comprising an engine which functions to provide power to the system for movement of the system and/or powering the lift mechanism.

7. The system of claim 1, further comprising an engine which functions to provide power to the system for movement of the system and/or powering the lift mechanism, wherein the engine comprises an electric engine and a battery powering the electric engine.

8. The system of claim 1, further comprising a control system coupled to the frame, wherein the control system controls an operation of the helicopter transport system.

9. The system of claim 1, wherein the lift mechanism comprises a scissor lift.

10. The system of claim 1, wherein the isosceles trapezoidal relationship of the wheels allows for a tighter turning radius relative to systems in which wheels are positioned in a square or rectangular relationship relative to each other.

11. The system of claim 1, wherein all wheels positioned towards the first end of the support frame are positioned outside the outer perimeter of the support frame and all wheels positioned towards the second end of the support frame are positioned within the perimeter of the support frame.

12. A method of transporting a helicopter, comprising:
positioning a helicopter transport system substantially beneath a helicopter positioned on a surface, wherein the helicopter transport system comprises:
a support frame, wherein the support frame is substantially rectangular;
a first pair of wheels positioned on opposing sides of the outer perimeter of the support frame towards a first end of the support frame;
a second pair of wheels positioned adjacent one another within the perimeter of the support frame towards a second end of the support frame such that a first distance between outer sides of the second pair of wheels, and all wheels positioned towards the second end of the support frame, is less than a second distance between inner sides of the first pair of wheels and all wheels positioned towards the first end of the support frame, such that the wheels are in a isosceles trapezoidal relationship, wherein the first end of the support frame is positioned opposite the second end of the support frame; and
a lift mechanism coupled to the support frame;
activating the lift mechanism such that a portion of the lift mechanism engages a portion of the helicopter elevating the helicopter above the surface; and
transporting the helicopter from a first position to a second position.

13. The method of claim 12, wherein the portion of the lift mechanism comprises a coupling mechanism, and wherein the portion of the helicopter comprises a landing strut.

14. The method of claim 12, wherein the lift mechanism is positioned between the first and second pair of wheels.

15. The method of claim 12, wherein the portion of the lift mechanism comprises a coupling mechanism, wherein the coupling mechanism comprises a saddle comprising a substantially non marring surface.

16. The method of claim 12, wherein at least the first pair of wheels turn such that the transport may turn.

17. The method of claim 12, further comprising an engine which functions to provide power to the system for movement of the system and/or powering the lift mechanism.

18. The method of claim 12, further comprising an engine which functions to provide power to the system for movement of the system and/or powering the lift mechanism, wherein the engine comprises an electric engine and a battery powering the electric engine.

19. The method of claim 12, further comprising a control system coupled to the frame, wherein the control system controls an operation of the helicopter transport system.

20. The method of claim 12, wherein the lift mechanism comprises a scissor lift.

\* \* \* \* \*